June 14, 1927.
O. F. WARHUS
1,632,460
STEERING MECHANISM FOR VEHICLES
Filed April 17, 1925     2 Sheets-Sheet 1
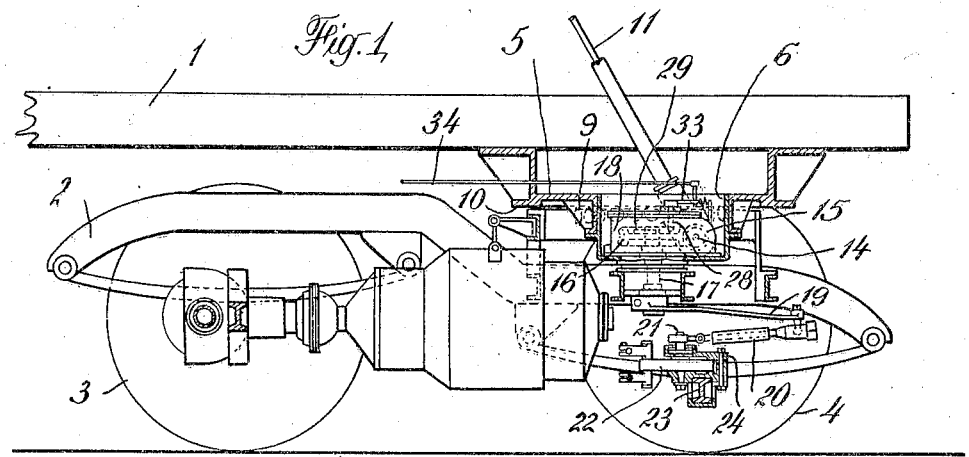
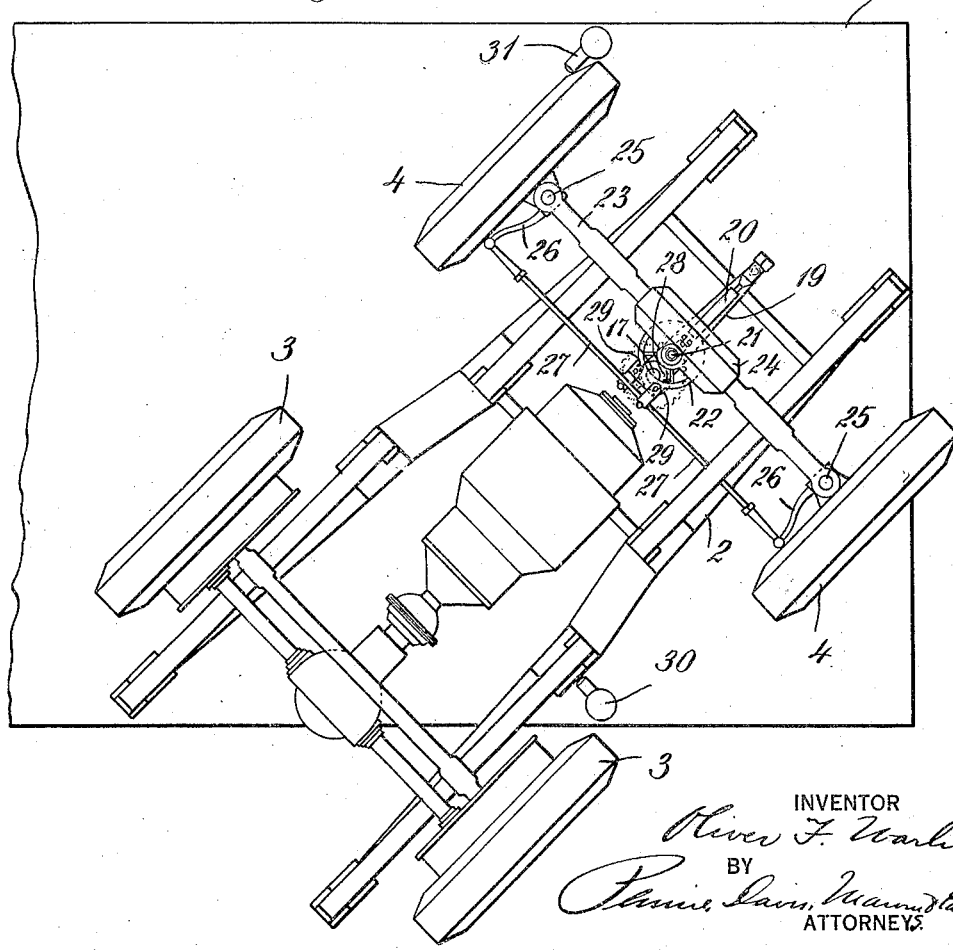
INVENTOR
Oliver F. Warhus
BY
ATTORNEYS June 14, 1927. 1,632,460
O. F. WARHUS
STEERING MECHANISM FOR VEHICLES
Filed April 17, 1925   2 Sheets-Sheet 2
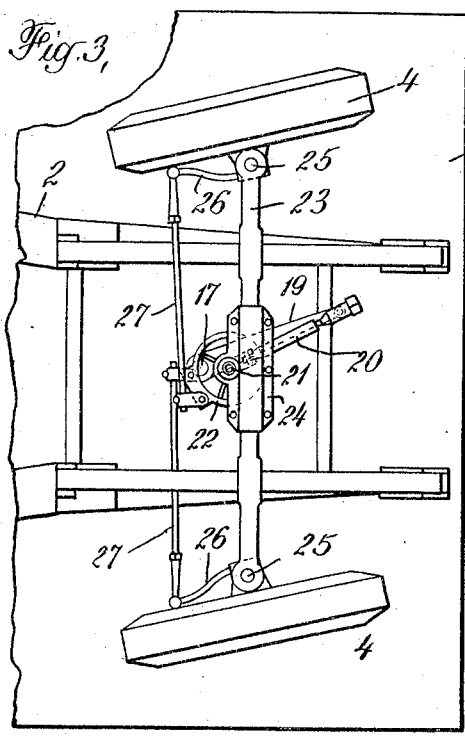
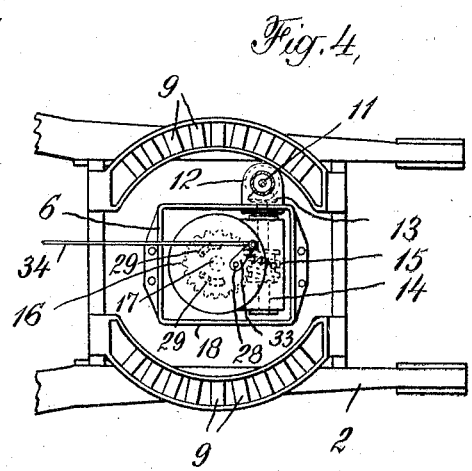
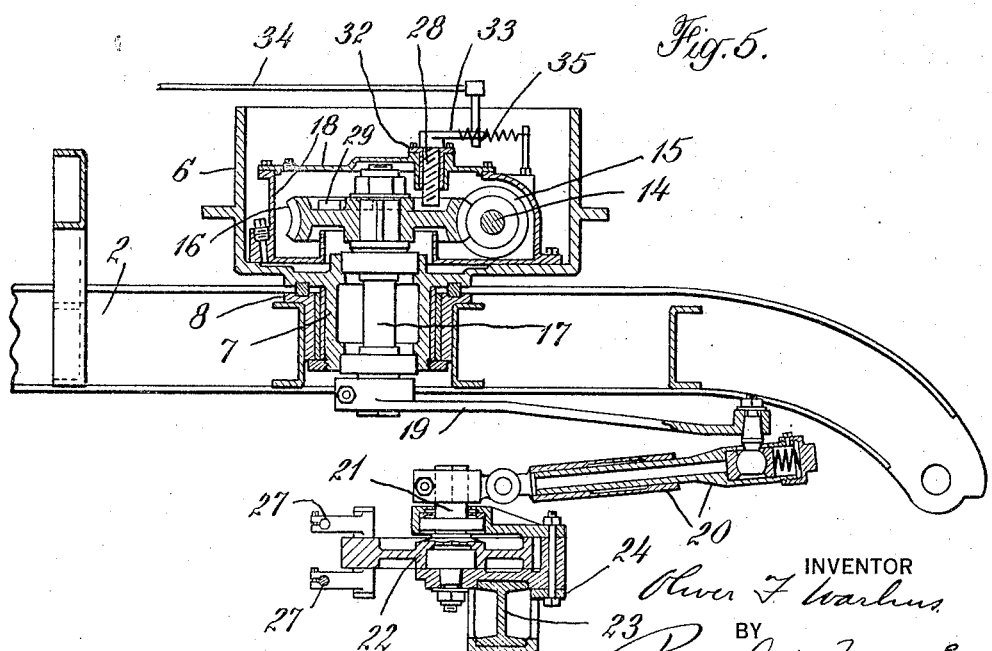
INVENTOR
Oliver F. Warhus.
BY
ATTORNEYS.

Patented June 14, 1927.

1,632,460

UNITED STATES PATENT OFFICE.

OLIVER F. WARHUS, OF ALBANY, NEW YORK, ASSIGNOR TO VERSARE CORPORATION, A CORPORATION OF NEW YORK.

STEERING MECHANISM FOR VEHICLES.

Application filed April 17, 1925. Serial No. 23,794.

This invention relates to steering mechanism for motor driven vehicles of that type in which the body is pivotally mounted on one or more trucks or bogies. The steering of such vehicles presents various difficulties especially in the case of those of considerable length. In my prior Patent No. 1,599,152 there is disclosed an improved type of steering mechanism for vehicles of the above mentioned character, the purpose of which is to overcome some of these difficulties and permit more accurate steering and better control of the vehicle.

The main object of the present invention is to provide additional improvements especially adapted for use in conjunction with steering mechanism of the general type disclosed in the aforesaid application which will insure even better control and more accurate steering of the vehicle.

In a vehicle of the type disclosed in the above mentioned patent, the operator located within the body cannot tell accurately the extent to which the front truck has been turned to one side or the other under the body. By turning the steering wheel, the front wheels of the front truck are turned angularly, and then as the vehicle proceeds, the truck swivels to an angular position determined by the angular position to which the front wheels have been turned, the front wheels being reversely turned during the swiveling action of the truck until, in the final angular position of the truck, the front wheels are in substantial parallelism with the rear wheels and with the truck frame. If the operator turns the steering wheel further in the same direction, this same action takes place and if continued far enough the truck would be caused to swivel around to the maximum position to which it is desired to have it turned. It is common to provide a stop which will prevent any outside forces, such as skidding tendencies from swiveling the truck beyond this point. If the parts are in this maximum relation and the operator, not knowing that the maximum relation has been reached, turns the steering wheel still further so as to give a further turning movement to the front wheels of the truck, then as the vehicle proceeds in its forward movement and as the truck cannot swivel further, the front wheels of the truck will slide over the ground by reason of their angular relation to the truck and excessive wear on the tires of those wheels will occur. In accordance with this invention, means are provided for guarding against such excessive wear occasioned in this manner. To that end means are provided which serve to limit turning movement of the steering wheel more than that amount which will bring the truck to its predetermined maximum angular position.

The stop for limiting the swiveling action of the bogie truck might be omitted as the above mentioned device for limiting the turning movement of the steering wheel can be so arranged as to prevent further turning of the steering wheel after the truck has swiveled to a predetermined angular position regardless of whether its swiveling action beyond this predetermined position is positively arrested by a stop. However, such an arrangement is not productive of the best results and it is desirable to have not only devices for limiting the turning movement of the steering wheel, but also a stop for limiting the swiveling action of the bogie all arranged so that there is a definite coordination of action whereby the steering wheel cannot be turned further than that amount which will bring the bogie into contact with the stop that limits its swiveling action.

The accompanying drawings illustrate the preferred embodiment of the invention in combination with steering mechanism of the general type disclosed in the above mentioned copending application.

In the drawings, Fig. 1 is a side elevation partly in section of the forward end of the chassis showing the improved steering mechanism applied to the forward truck; Fig. 2 is a bottom plan view of the forward truck and body frame showing the position assumed by the truck relative to the body frame after it has made its maximum swiveling movement; Fig. 3 is a bottom plan view of the front wheels of the forward truck showing certain portions of the steering mechanism associated therewith; Fig. 4 is a plan view of a portion of the truck frame and certain parts of the steering mechanism which are associated with the body frame; and Fig. 5 is a vertical section of the steering mechanism.

The body frame of the vehicle is represented at 1 and the frame of the forward truck is shown at 2. The truck in the present instance is provided with a pair of rear wheels 3 and a pair of front wheels 4. The body frame is pivotally mounted on the truck frame by means of a king pin construction comprising a casting 5 secured to the body frame, a king pin casting 6 secured to the casting 5, and the king pin proper 7 formed on the casting 6 (Fig. 5). The king pin 7 is mounted to turn in a socket 8 mounted on the truck frame 2. The vertical load of the body is supported by roller bearings 9 associated with the truck frame and which are in rolling contact with one of the lower faces 10 of the casting 5. The roller bearings 9 constitute in effect a fifth wheel by means of which the body frame is supported on the truck.

A steering post 11, which may be actuated by means of the usual steering wheel on the vehicle, is provided on its lower end with a bevel pinion 12 (Fig. 4) which meshes with a corresponding bevel pinion 13 mounted on a horizontal shaft 14. The shaft 14 carries a worm 15 meshing with a worm wheel 16 and is keyed to a vertical shaft 17 extending axially through and journalled in the king pin. For this purpose the king pin is made hollow as shown in the drawings. The gearing 15, 16 may be located in the hollow casting 6 and is preferably enclosed by a casing 18 which may be filled with lubricant. The lower end of the shaft 17 has secured thereto an arm 19 which projects forwardly and which is pivotally connected at its forward end to a telescopic tongue 20. The tongue 20 extends rearwardly from its point of connection with the arm 19 and is operatively connected with a spindle 21 rotatably mounted on the truck frame. A rotatable member 22 is rigidly secured to the spindle 21. The transverse beam or axle 23 on which the front wheels are pivoted constitutes a convenient support for the spindle 21 and the rotatable member 22, a suitable bracket 24 being provided for attaching these parts to the axle and for furnishing the necessary mounting for the rotating parts. The front wheels 4 of the truck are mounted to turn about substantially vertical axes 25 located at the extremities of the axle 23. Each wheel is provided with the usual steering arm 26. The arms 26 are pivotally connected by means of rods 27 to the rotatable member 22. Each rod 27 is connected to the rotatable member 22 on the far side of the center line of the member as shown in Figs. 2 and 3. By this arrangement whenever the rotatable member 22 is turned about its axis the front wheels are deflected or turned about their vertical axes differential or unequal amounts so that for any given turning radius each front wheel is substantially at right angles to a radius drawn from the center of the wheel to the point about which the truck travels as a center. When the steering wheel on the vehicle is actuated, rotation is imparted to the shaft 17 through the gearing 12, 13, 15 and 16. This swings the arm 19 in a horizontal plane and also swings the tongue 20 about the axis of the spindle 21 thereby rotating this spindle and the member 22. The rotation of the member 22 causes the front wheels 4 to turn about their vertical axes to steer the front truck. The axis of the spindle 21 is located in advance of the axis of the shaft 17. In the normal position of the parts the arm 19 lies directly over and in parallelism with the tongue 20, the axis of the spindle 21 then lying directly under the arm 19. However, when the arm 19 is moved to one side or the other as shown in Fig. 3, the arm 19 moves away from its position directly over the axis of the spindle 21. The front wheels now having been turned, the forward motion of the vehicle will cause the front truck to swivel relatively to the body frame. As the truck thus swivels, the axis of the spindle 21, being on the truck frame, will move back toward a position directly under the arm 19. This will cause the front wheel to turn back toward their original position in alignment with the rear wheels, and when this condition occurs the truck will cease its swiveling movement with respect to the body frame and the axis of the spindle 21 will tend to remain directly under the arm 19. The longitudinal axis of the truck frame will then be at an angle with respect to the longitudinal axis of the body frame and all four wheels of the truck will be in alignment. If it is desired to steer the front wheels still further in the same direction, or if it is desired to steer them in the reverse direction, the steering wheel is further actuated to swing the arm 19 in the proper direction and then the truck will again swivel relatively to the body frame until the axis of the spindle 21 again moves under the arm 19 when the swiveling action of the truck will again cease with the front and rear wheels of the truck in alignment.

One function of the steering mechanism described above is to prevent unintentional swiveling of the truck under the vehicle body. Without some arrangement such as described, the truck would have a tendency to continue swiveling with respect to the body frame. This would render control of the vehicle difficult because the operator is not always aware of the exact angular position of the truck under the body and he may turn the front wheels too far or may neglect to turn them back in time to prevent excessive swiveling action of the truck. This is especially true in vehicles of considerable length in which there is a lag between the turning movement of the front wheels and the resulting lateral movement of the forward end of the body. However, with an arrangement such as described above for any given actuation of the steering wheel, the front wheels of the truck will straighten up as the truck swivels relatively to the body frame.

It is customary to provide stops such as those shown at 30 and 31 to prevent further swiveling movement of the truck in either direction when it has reached the maximum position to which it is desired to have it turned. Figure 2 shows the truck in its maximum angular relation with respect to the body and in this position a portion of the truck frame abuts against the stop 30 to prevent further swiveling of the truck in the same direction. If the truck were in the reverse maximum angular position with respect to the body the truck frame would abut against the other stop 31.

When the truck is in the position shown in Figure 2 or the corresponding reverse position, any further turning of the front wheels such as would tend to cause the truck to swivel further in the same direction would have no effect in accomplishing this, due to the fact that any further swiveling action of the truck in the same direction is positively prevented. Under these conditions the additional turning of the front wheels would cause them to slide over the ground as the vehicle proceeds in its forward movement except for the swinging movement of the rear end of the body and even so such slippage of the front wheels would occur if they were turned an excessive amount, this being due to the fact that the front truck cannot respond by swiveling further with respect to the body. The means now to be described prevents or minimizes such slippage. In its preferred form this means includes a pin 28 preferably mounted immediately above the worm wheel 16. The cover of the casing 18 constitutes a convenient part on which to mount this pin. The upper face of the worm wheel 16 has secured thereto two abutments 29 so located that when the worm wheel 16 moves through a predetermined angle in either direction, the forward end of one of the abutments 29 will come into contact with the pin 28 and thereby positively prevent further movement of the worm wheel. It is therefore impossible to turn the steering wheel more than that amount which will swing the arm 19 to the angle shown in Fig. 2 or to the corresponding angle in the other direction. Figure 2 shows the arm 19 swung to its maximum position in one direction and for this position of the arm the truck will move to its maximum angular position against the stop 30. As the truck swivels to its maximum angular position, the front wheels are reversely turned toward alignment with the rear wheels. Fig. 2 shows the front wheels parallel with the bogie frame in the final angular position of the truck. However, in practice the final swiveling movement of the bogie never reversely turns the front wheels entirely to their position of complete alignment with the rear wheels. This is due to the fact that the rear end of the vehicle in turning keeps the front wheels of the front truck turned just enough to cause the front truck to move in the arc of a circle having the same center as the arc of the circle in which the rear truck moves. The stops on the steering mechanism and the stops 30 and 31 are so positioned and corelated that when the vehicle is moving in the arc of a circle with the front truck in its maximum angular position the front truck frame will be in contact with one of the stops 30, 31 and the arm 19 will be limited by its stop mechanism but at this time the front wheels of the front truck will still be slightly turned as above indicated. However, they are prevented from being turned beyond this position by the stop devices on the steering mechanism. Hence, undesirable slippage of the front wheels of the front truck is prevented.

In the foregoing description it has been stated, in effect, that the steering gear stops are so located that when the bogie truck moves to its final angular position against either the stop 30 or the stop 31 the front wheels of the bogie truck cannot be turned further. This relation and coordination between the two sets of stops may be stated in another way. The final angular position to which it is desired to bring the bogie truck is known for a given vehicle. The stops for the steering gear prevent turning of the front wheels more than that amount which will bring the bogie truck to a certain angular position. Therefore, it may be said that the stops for the steering gear are so located that they, and not the stops 30 and 31, are the primary factors in preventing the bogie truck from swiveling beyond either of its predetermined maximum angular positions during the steering operation. Viewing the matter in this way it may be said that the stops 30 and 31 are so located that the frame of the bogie truck will abut against one of these stops gently just as it reaches the maximum angular position determined by the position of one of the steering gear stops. It is true that while the parts are in this position the front wheels cannot be turned further and thereby produce a tendency to skid as pointed out above, but this arrested condition of the steering gear may be considered as having been brought about for the primary purpose of bringing the bogie truck to its predetermined maximum angular position in which position either the stop 30 or the stop 31 then acts to prevent any outside forces, such as skidding tendencies, from turning the truck beyond its angular position.

It may sometimes be desirable under special and unusual conditions to render the mechanism 28, 29 inoperative or ineffective so that front wheels may be turned beyond the angular position normally permitted by the steering mechanism. For this purpose the pin 28 may be threaded as shown in Fig. 5 and the socket 32 in which the pin is mounted may be likewise threaded so that when the pin is turned in the socket it will move longitudinally therein. In order to turn the pin an arm 33 may be secured thereto which may be actuated by a rod 34 extending to any suitable point of control on the vehicle. By actuating the rod 34 the pin 28 may be shifted axially so that it will be raised out of the path of the abutments 29. Under these circumstances the front wheels of the truck may be turned further than the amount normally permitted by the mechanism when the pin 28 is effective to limit its action. A spring 35 may be employed to return the pin to its normal position in the path of the abutments 29.

The rear end of the truck has not been illustrated in the drawings as the particular method of mounting the body on the rear wheels of the vehicle forms no part of the present invention. It might be stated, however, that the rear end of the body may be pivotally mounted on a truck provided with four or more wheels and the front wheels of the rear truck may be steered by automatic mechanism of the type disclosed in several of my copending applications.

I claim:

1. A vehicle comprising a body, a truck having front and rear wheels on which the forward portion of the body is pivotally mounted, steering mechanism for turning the front wheels of the truck, means for preventing swiveling of the truck beyond the position in which it occupies a predetermined maximum angular relation with respect to the body, mechanism operating during the swiveling of the truck to reversely turn the front wheels toward alignment with the rear wheels and means effective when the truck is in its maximum angular relation with respect to the body to limit turning of the front wheels in the direction tending to cause the truck to swivel beyond said maximum angular position.

2. A vehicle comprising a body, a truck having front and rear wheels on which the forward portion of the body is pivotally mounted, steering means for turning the front wheels of the truck including mechanism for reversely turning the front wheels toward alignment with the rear wheels when the truck swivels relatively to the body, means to prevent actuation of the steering means beyond an amount which will bring the truck to a predetermined angular position with respect to the body and means effective when the truck reaches said predetermined angular position for preventing swiveling movement of the truck beyond said predetermined angular position.

In testimony whereof I affix my signature.

OLIVER F. WARHUS.